United States Patent
Chang

(10) Patent No.: US 9,338,267 B2
(45) Date of Patent: May 10, 2016

(54) PHOTOGRAPHIC ASSIST APPARATUS OF MOBILE COMMUNICATIONS UNIT

(71) Applicant: Bitplay Inc., Taipei (TW)

(72) Inventor: Chia-Wei Chang, Taipei (TW)

(73) Assignee: BITPLAY INC., Taipei (TW)

( * ) Notice: Subject to any disclaimer, the term of this patent is extended or adjusted under 35 U.S.C. 154(b) by 15 days.

(21) Appl. No.: 14/571,556

(22) Filed: Dec. 16, 2014

(65) Prior Publication Data

US 2015/0181007 A1    Jun. 25, 2015

(30) Foreign Application Priority Data

Dec. 20, 2013   (TW) .............................. 102224087 U

(51) Int. Cl.
| | |
|---|---|
| *H04M 1/00* | (2006.01) |
| *H04M 1/02* | (2006.01) |
| *G03B 17/56* | (2006.01) |
| *H04M 1/18* | (2006.01) |
| *H04M 1/23* | (2006.01) |

(52) U.S. Cl.
CPC .......... *H04M 1/0264* (2013.01); *G03B 17/568* (2013.01); *H04M 1/18* (2013.01); *H04M 1/23* (2013.01)

(58) Field of Classification Search
CPC ............. H04M 1/0264; H04M 1/0266; G03B 17/568; G03B 17/58; G03B 17/56
See application file for complete search history.

(56) References Cited

U.S. PATENT DOCUMENTS

| | | | | |
|---|---|---|---|---|
| 7,903,396 | B2 * | 3/2011 | Sasaki .................. | H05K 5/0239 361/679.01 |
| 7,907,422 | B2 * | 3/2011 | Tokuyama ............... | A45C 1/06 361/730 |
| 8,251,210 | B2 * | 8/2012 | Schmidt .................. | H04M 1/04 206/320 |
| 9,256,252 | B2 * | 2/2016 | Chao ..................... | H04B 1/3888 |
| 2011/0034221 | A1 * | 2/2011 | Hung ..................... | A45C 11/00 455/575.8 |
| 2011/0136555 | A1 * | 6/2011 | Ramies ..................... | B67B 7/16 455/575.8 |
| 2011/0253569 | A1 * | 10/2011 | Lord ...................... | B65D 25/20 206/320 |
| 2011/0267748 | A1 * | 11/2011 | Lane ........................ | A45F 5/00 361/679.01 |

* cited by examiner

*Primary Examiner* — Wesley Kim
*Assistant Examiner* — Richard Chan
(74) *Attorney, Agent, or Firm* — Bacon & Thomas, PLLC

(57) ABSTRACT

A photographic assist apparatus of a mobile communications unit includes a tank, a shaft and a rod. A groove is formed at the bottom of the inner side of the tank. The shape of the groove is designed corresponding to the shape of the rod, for accommodating the rod. A first and a second button portions are disposed at two ends of the rod respectively. And a central portion is located between the first and the second button portions. The shaft is disposed in the groove. The rod has a hole located at the central portion thereof for the shaft setting through. When a user presses the first button portion, the rod is rotated to turn a small rotation angle by taking the shaft as an axis, to drive the second button portion moving, and the rotation angle is limited by the gap between the groove and the rod.

14 Claims, 8 Drawing Sheets

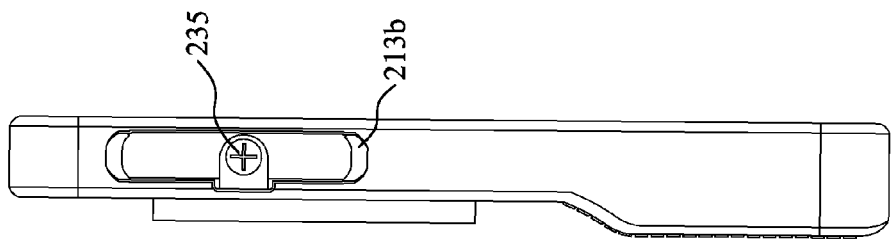
FIG. 4C
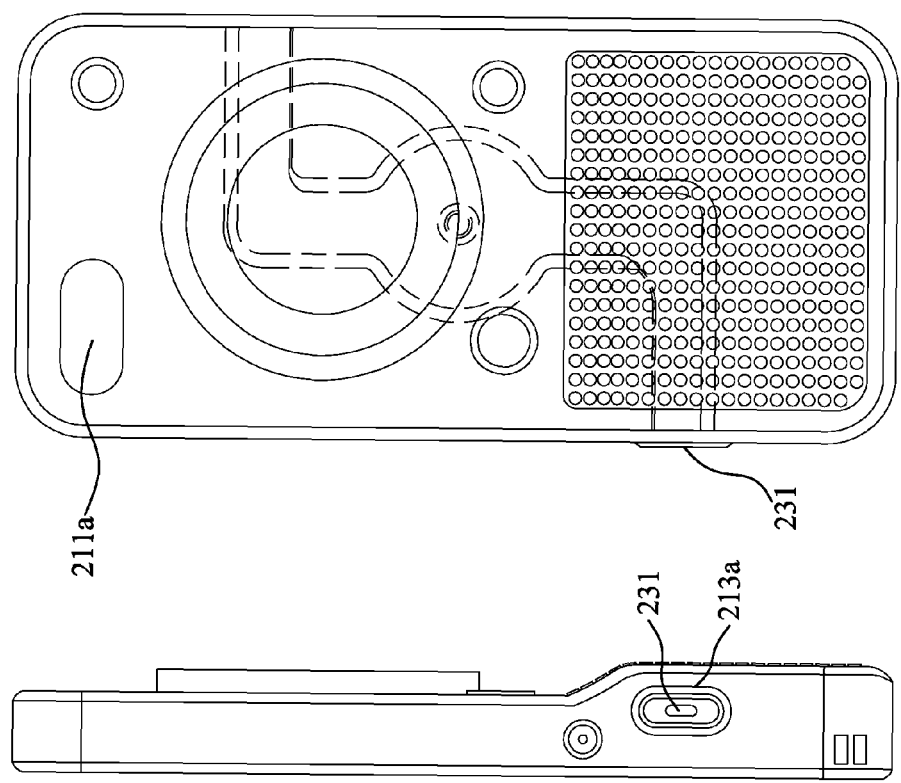
FIG. 4A
FIG. 4B

PHOTOGRAPHIC ASSIST APPARATUS OF MOBILE COMMUNICATIONS UNIT

BACKGROUND OF THE INVENTION (1) Field of the Invention

The invention relates to a photographic assist apparatus of mobile communications unit, and especially relates to one with creative pressing button fits in with the customarily used operation shutter button.

(2) Description of the Prior Art

FIG. 1 is a diagram schematic view for a conventional smart cell phone of mobile communications unit. The smart cellular phone 100 comprises an earpiece 110, a touch screen 120, a virtual shutter button 122, a master key 130 and a first lens 140 disposed on the front side thereof, a plurality of entity function keys 150, 151 and a physical shutter button 150a disposed at the lateral side thereof, as well as a second lens 160 disposed on the back side thereof. In self shot-photographic mode, if user holds the smart cellular phone 100 in vertical status to let the upper first lens 140 face toward self so that he/she can watch the touch screen 120 for adjusting orientation of the smart cellular phone 100. At this moment, the physical shutter button 150a located at the lower left side of the smart cellular phone 100 while the master key 130 located at the beneath side of the smart cellular phone 100.

In scene shot-photographic mode, if user holds the smart cellular phone 100 in vertical status to let the upper second lens 160 face toward expected scene so that he/she can watch the touch screen 120 for adjusting orientation of the smart cellular phone 100. Similarly, at this moment, the physical shutter button 150a located at the lower left side of the smart cellular phone 100 while the master key 130 located at the beneath side of the smart cellular phone 100. In both photographic modes aforesaid, if the user accustomed to use right hand for handling everything, he/she may feel inconvenient to press the physical shutter button 150a under avoidance of blocking the view of the touch screen 120. Therefore, the smart cellular phone 100 expediently provides a virtual shutter button 122 to let the user hold the smart cellular phone 100 in horizontal status as shown in FIG. 1 so that the virtual shutter button 122 located at right side of the smart cellular phone 100 for easy access by the right thumb of the user.

However, most users are accustomed to use right forefinger for pressing physical shutter button 150a or virtual shutter button 122. The expedient means aforesaid does not substantially solve the inconvenient issue. Having realized and addressed foregoing issue, the photographic assist apparatus of mobile communications unit in the present invention is contrived out.

SUMMARY OF THE INVENTION

One of the objects for the present invention is to provide a photographic assist apparatus of mobile communications unit, which can be used with conventional smart cell phone such that the position of the created pressing button fits in with the customarily used operation shutter button.

In order achieve foregoing objects, the present invention provide a photographic assist apparatus of mobile communications unit comprising a tank, a shaft and a rod. The tank comprises a bottom plate and a pair of juxtaposed parallel of first compass plate and second compass plate. The first compass plate has a first active opening and the second compass plate has a second passive opening, such that the first and the second compass plates surrounds and contacts a peripheral of the bottom plate, to define an accommodating space. A size for the accommodating space of the tank is big enough to accommodate a smart cellular phone. The first active opening is diagonally opposite to the second passive opening, and the bottom plate comprises a confining groove extending from the first active opening to the second passive opening The shaft is fixed in the confining groove of the tank. And the rod has a profile corresponding to a profile of the confining groove for accommodated in the confining groove with slightly confined allowance, and comprises a central portion, a first active button portion interlocked with a second passive button portion. The central portion has a shaft hole. The first active button portion and the second passive button portion are respectively disposed at both ends of the rod. The first active button portion is assembled in the first active opening, and the second passive button portion is assembled in the second passive opening, and the shaft is placed through the shaft hole. When an user presses the first active button portion, the second passive button portion is interlocked to inwardly press via the rotation of the rod on the shaft with a maximal rotational angle of the rod being limited to one degree by the confined allowance between the confining groove and the rod.

In one exemplary embodiment, the rod is a hand-crank-shaped slab comprising a first bent portion and a second bent portion such that the first bent portion is disposed between the first active button portion and the central portion while the second bent portion is disposed between the second passive button portion and the central portion. Both of the first bent portion and the second bent portion are configured as right angle such that both of the first bent portion and the second bent portion face outwardly in opposed manner. The first active opening is created in a lower section of the first compass plate for exposing the first active button portion to the user while the second passive opening is created in an upper section of the second compass plate for exposing the second passive button portion, as well as the first bent portion, the central portion and the second bent portion of the rod are arranged in line to be parallel with the first compass plate and the second compass plate.

In one exemplary embodiment, a distance between the first bent portion and the shaft hole of the rod is larger than a distance between the second bent portion and the shaft hole of the rod. In particular, the distance between the first bent portion and the shaft hole of the rod is in range of 26.65 mm to 31.05 mm; the distance between the second bent portion and the shaft hole of the rod is in range of 22.25 mm to 26.65 mm.

In one exemplary embodiment, a minimal distance between a peripheral of the shaft and an inner surface of the shaft hole is in range of 0.05 mm to 0.10 mm.

In one exemplary embodiment, both profiles of the central portion and the corresponding portion of the confining groove are shaped into juxtaposed combination of dual arc lobes.

In one exemplary embodiment, the rod has a thickness in 1 mm and a width in 15 mm.

In one exemplary embodiment, the first bent portion of the rod has a first internal side opposite to a first external side, the confining groove has a first internal surface opposite to a second internal surface, the first internal side and the first external side of the first bent portion correspond with the first internal surface and the second internal surface of the confining groove, such that a distance between the first internal side and the first internal surface is less than a distance between the first external side and the second internal surface. And, the second bent portion of the rod has a second internal side opposite to a second external side, the confining groove has a third internal surface opposite to a fourth internal surface, the second internal side and the second external side of the second bent portion correspond with the third internal surface and the fourth internal surface of the confining groove, such that a distance between the second internal side and the third internal surface is less than a distance between the second external side and the fourth internal surface.

In one exemplary embodiment, both profiles of the rod and the confining groove are shaped into parallelogram that the rod has a left flank opposite to a right flank, and the confining groove has a left wall opposite to a right wall, such that in a region from the first active button portion to the central portion, a distance between the left flank and the left wall is greater than a distance between the right flank and the right wall; while in a region from the second passive button portion to the central portion, a distance between the right flank and the right wall is greater than a distance between the left flank and the left wall.

BRIEF DESCRIPTION OF THE DRAWINGS

FIGS. 4A to 4D are a series of schematic views respectively showing a planar back view, a left lateral view, a right lateral view and a perspective back view for a photographic assist apparatus of mobile communications unit in one exemplary embodiment of the present invention.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
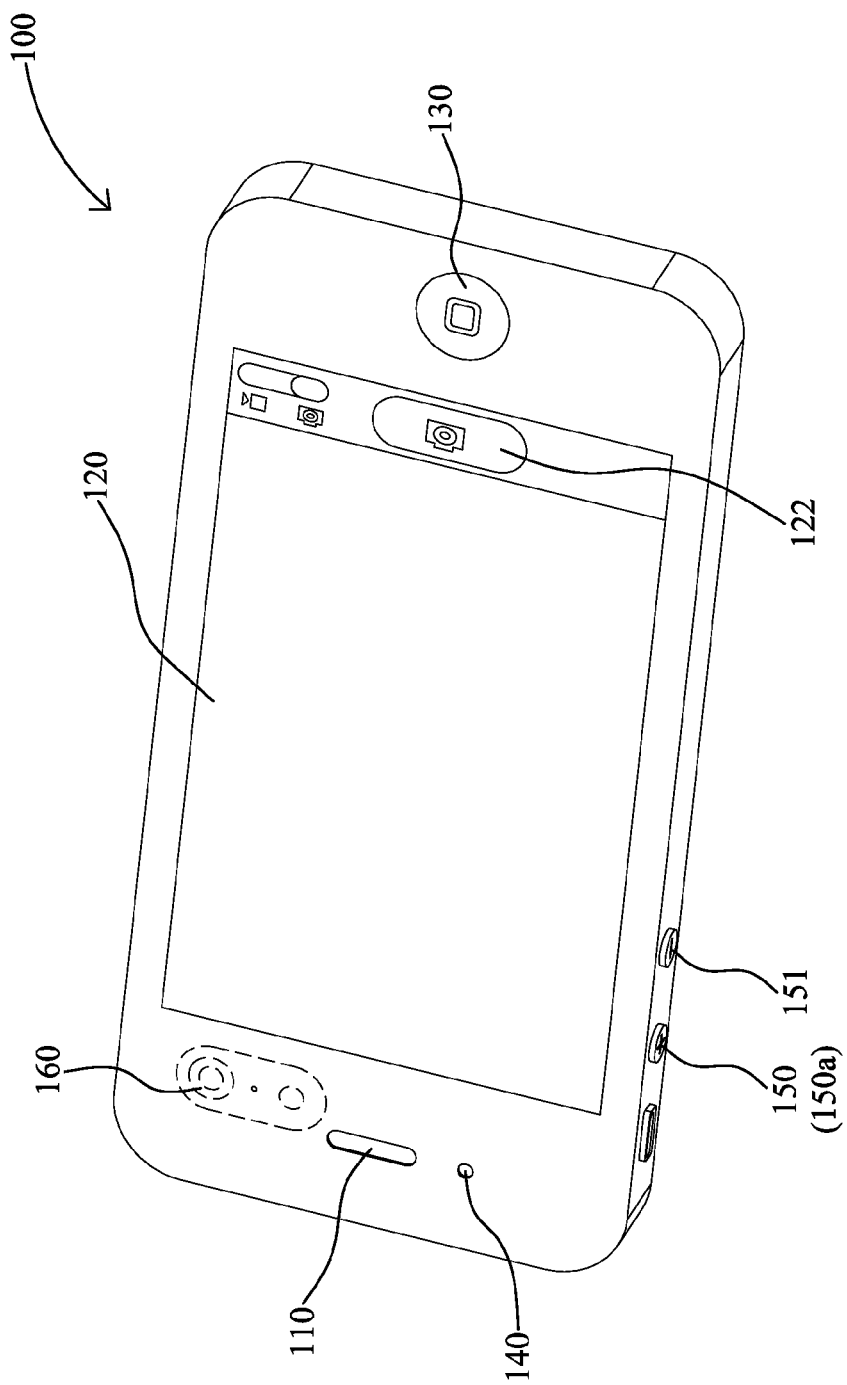
FIG. 1 is a diagram schematic view for a conventional smart cell phone of mobile communications unit.
Figure 2A:
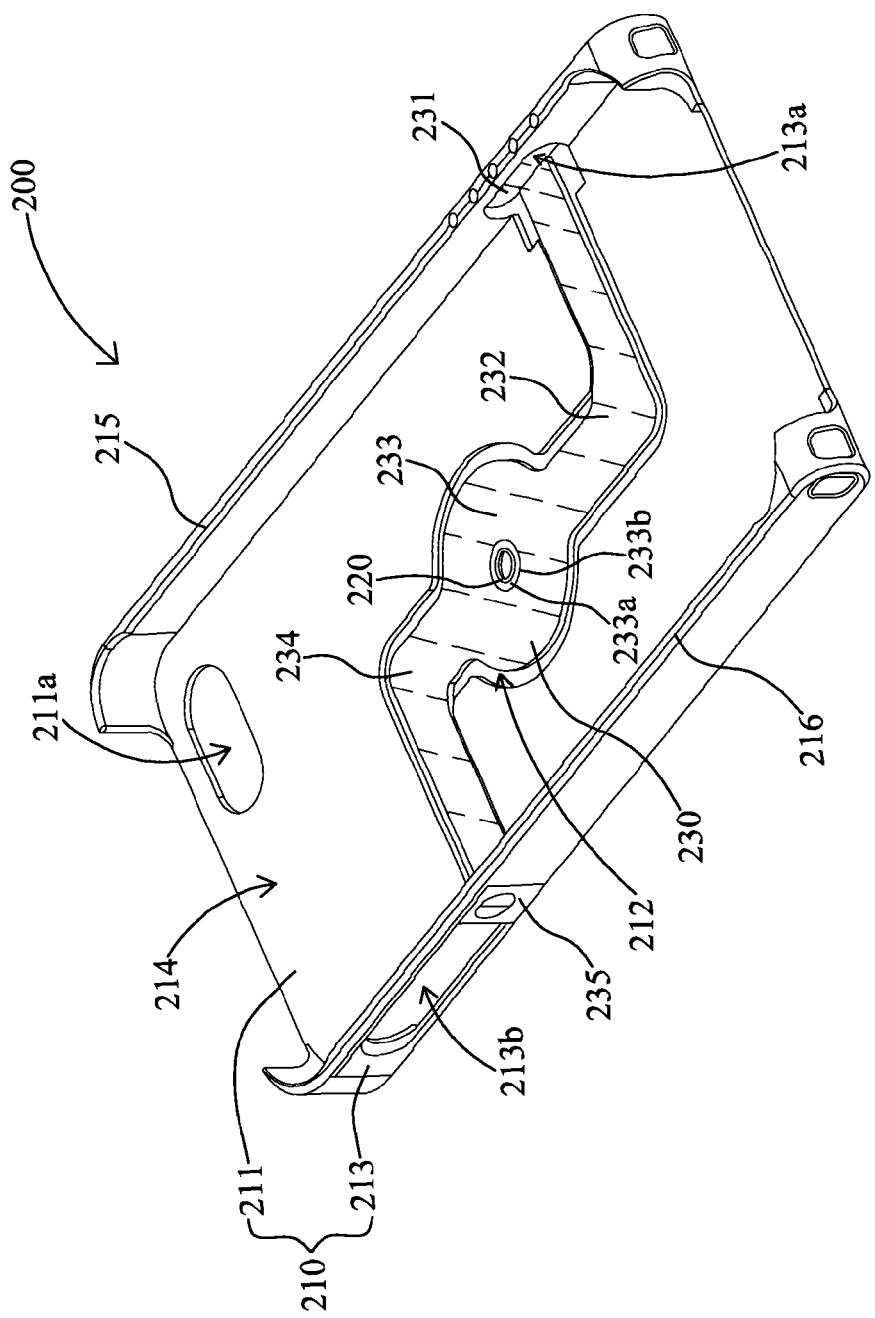
FIG. 2A is a perspective schematic view showing a photographic assist apparatus of mobile communications unit for the first exemplary embodiment of the present invention.
Figure 2B:
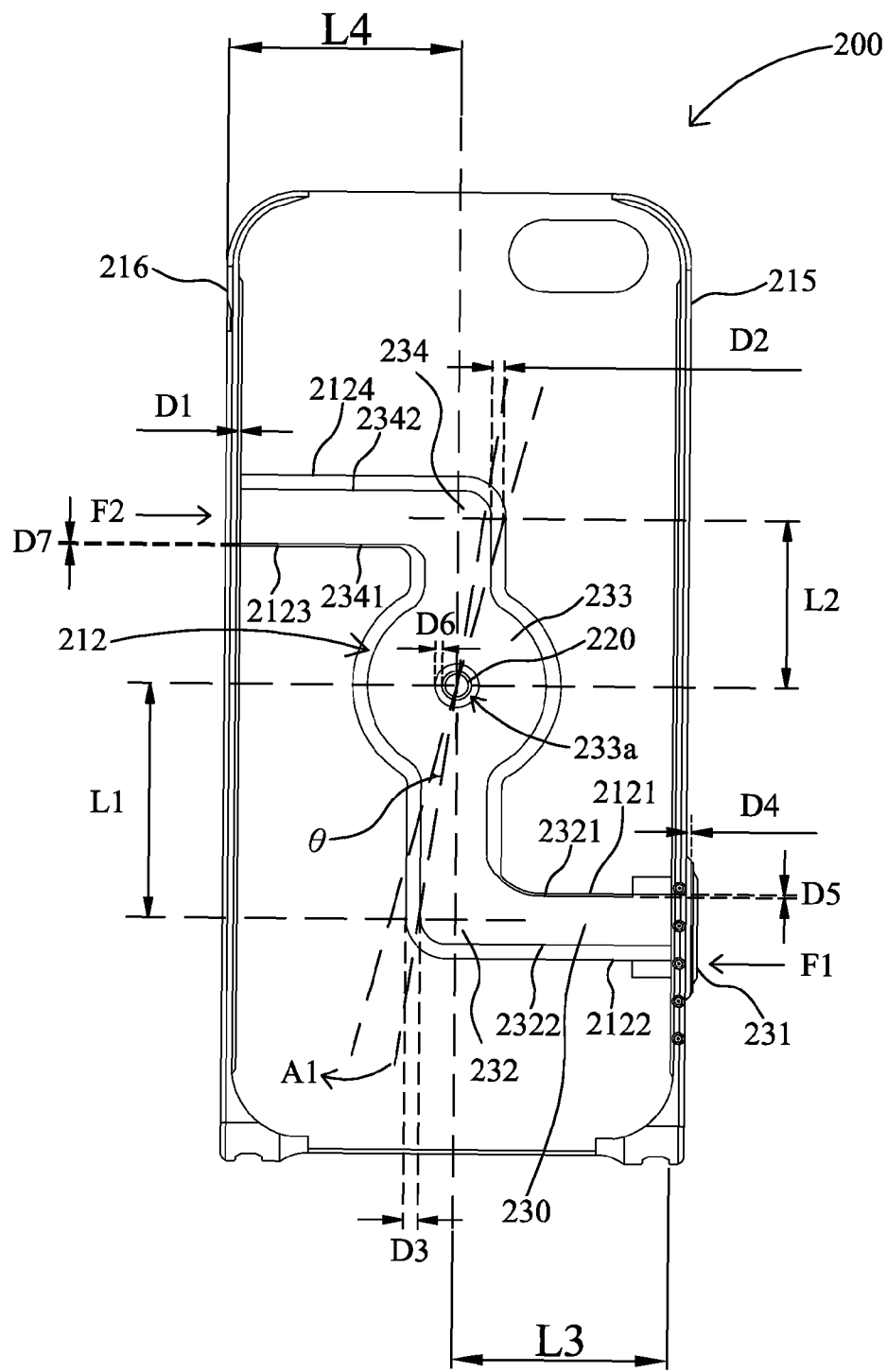
FIG. 2B is an internal planar view showing a photographic assist apparatus of mobile communications unit for the first exemplary embodiment of the present invention.

FIG. 2A is a perspective schematic view showing internal structure in a photographic assist apparatus of mobile communications unit for the first exemplary embodiment of the present invention. The photographic assist apparatus 200 here comprises a tank 210 serving as holder or chassis, a shaft 220 and a rod 230. The rod 230 is a hand-crank-shaped slab, includes a central portion 233 with a shaft hole 233a as well as a first active button portion 231 with active button means and an interlocked second passive button portion 235 with passive button means respectively disposed at both ends thereof. The tank 210 includes a bottom plate 211 and a pair of juxtaposed parallel compass plates 213 surrounding and contacting the peripheral of the bottom plate 211 such that the bottom plate 211 contains a confining groove 212, whose profile corresponds that of the rod 230 for accommodating the rod 230 with slightly confined allowance. The shaft 220 is created in the confining groove 212 at a center of the tank 210, includes a bushing or shaft collar 233b for fixing the rod 230 to the bottom plate 211 of the tank 210 via the shaft hole 233a of the rod 230. In practical application, when an user presses the first active button portion 231, the second passive button portion 235 is interlocked to inwardly press via the rotation of the rod 230 on the shaft 220. With confinement of the confining groove 212 of the tank 210, the rotational angle θ of the rod 230 is limited by the confined allowance between the confining groove 212 and the rod 230 as shown in FIG. 2B.

As shown in FIG. 2A, in the tank 210, an accommodating space 214 is defined by the bottom plate 211 and the compass plates 213 for accommodating the smart cellular phone 100. A first active opening 213a is created in the lower section of one compass plate 213 for exposing the active button means 231 to the user while a second passive opening 213b is created in the upper section of another compass plate 213 for exposing the passive button means 235 to corresponding physical shutter button 150a of the smart cellular phone 100 if the smart cellular phone 100 is put into the accommodating space 214 in the photographic assist apparatus 200 of the present invention. Moreover, a third opening 211a is created in the right top margin of the bottom plate 211 for exposing the corresponding second lens 160 of the smart cellular phone 100 if the smart cellular phone 100 is put into the accommodating space 214 in the photographic assist apparatus 200 of the present invention Please refer to FIGS. 2A and 2B. The confining groove 212 here is created in the internal surface of the accommodating space 214 for accommodating the rod 230 with the shaft 220 to provide a lever linkage between the active button portion 231 and the passive button portion 235. In this exemplary embodiment, the rod 230 is a hand-crank-shaped slab made of polycarbonate with thickness in 1 mm and width in 15 mm preferably while the shaft 220 is a hollow cylinder for fixing in the confining groove 212 via the central portion 233 with the shaft collar 233b of the rod 230.

From the corresponding first active opening 213a to the second passive opening 213b, the rod 230 orderly includes a first active button portion 231 with active button means, a first shank arm, a first bent portion 232, a first stem arm, a central portion 233, a second stem arm, a second bent portion 234, a second shank arm and a second passive button portion 235 with passive button means. The first active button portion 231 with active button means and the second passive button portion 235 with passive button means are interlocked by the rod 230. The first active button portion 231 with active button means is disposed in the first active opening 213a with slight protrusion out of the tank 210 for being pressed by the user while the second passive button portion 235 with passive button means is disposed in the second passive opening 213b in flush with surface of the compass plate 213 for pressing on the physical shutter button 150a of the smart cellular phone 100 if the smart cellular phone 100 is put into the accommodating space 214 in the photographic assist apparatus 200 of the present invention. The shaft hole 233a with shaft collar 233b are disposed in the central portion 233 of the rod 230 for sleeving over the shaft 220.

In one exemplary embodiment, the compass plates 213 includes a pair of juxtaposed parallel first compass plate 215 and second compass plate 216 surrounding and contacting the peripheral of the bottom plate 211. A first active opening 213a is created in a lower section of the first compass plate 215 for exposing the active button portion 231 to the user while the second passive opening 213b is created in an upper section of the second compass plate 216 for exposing the passive button portion 235 to corresponding physical shutter button 150a of the smart cellular phone 100 if the smart cellular phone 100 is put into the accommodating space 214 in the photographic assist apparatus 200 of the present invention. The first bent portion 232, first stem arm, central portion 233, second stem arm and second bent portion 234 of the hand-crank-shaped rod 230 are arranged in line to be parallel with the first compass plate 215 and second compass plate 216. Moreover, both of the first bent portion 232 and second bent portion 234 are configured as right angle such that both of the first bent portion 232 and second bent portion 234 face outwardly in opposed manner.

As shown in FIGS. 2A and 2B, because the central portion 233 of the rod 230 is fixed in the confining groove 212 of the bottom plate 211, when the user applies an active force F1 to the first active button portion 231, the first shank arm, first bent portion 232 and first stem arm will rotate along the clockwise arrowhead A1 with a rotational angle θ; and the second stem arm, a second bent portion 234 and second shank arm will rotate in opposed direction with same rotational angle θ by lever movement so that the second passive button portion 235 is interlocked to create an inward passive force F2 for pressing the physical shutter button 150a of the smart cellular phone 100 via the rotation of the rod 230 on the shaft 220 if the smart cellular phone 100 is put into the accommodating space 214 in the photographic assist apparatus 200 of the present invention. L1 denotes to the distance between the first bent portion 232 and the shaft hole 233a of the hand-crank-shaped rod 230, which is also the length of first stem arm. L2 denotes to the distance between the second bent portion 234 and the shaft hole 233a of the hand-crank-shaped rod 230, which is also the length of second stem arm. By principle in mechanical lever, the equation (F1×L1)=(F2×L2) is found, which means that the product of the active force F1 multiplying the length of first stem arm L1 is equivalent the passive force F2 multiplying the length of second stem arm L2. Because the lever movement of the rod 230 is confined by the confining groove 212 of the bottom plate 211, the maximal rotational angle θ is limited to one degree (1°).

For the purpose of easily operating the photographic assist apparatus 200 of the present invention on the basis of principle in mechanical lever, the distance (L1) between the first bent portion 232 and the shaft hole 233a of the hand-crank-shaped rod 230, which is also the length of first stem arm is larger than the distance (L2) between the second bent portion 234 and the shaft hole 233a of the rod 230, which is also the length of second stem arm so that the active force F1 is less than passive force F2. In practical application, the length (L1) of first stem arm is in range of 26.65 mm to 31.05 mm while the length (L2) of second stem arm is in range of 22.25 mm to 26.65 mm. In one exemplary embodiment, the length (L1) of first stem arm equals the length (L2) of second stem arm so that the active force F1 and passive force F2 are always kept equivalent.

In one exemplary embodiment, in order to let the central portion 233 of the rod 230 be able to smoothly rotate on the shaft 220 in the confining groove 212 of the tank 210, both profiles of the central portion 233 and a corresponding portion of the confining groove 212 are shaped into juxtaposed combination of dual arc lobes, and a minimal distance D6 between the peripheral of the shaft 220 and the inner surface in the shaft collar 233b of the shaft hole 233a is in range of 0.05 mm to 0.10 mm.

In one exemplary embodiment, the gapes D2, D3, D5 and D7 between the edges of the rod 230 and the corresponding edges of the confining groove 212 are defined by a first internal side 2321 and a first external side 2322 of the first bent portion 232 in corresponding with a first internal surface 2121 and a second internal surface 2122 of the confining groove 212; while a second internal side 2341 and a second external side 2342 of the second bent portion 234 in corresponding with a third internal surface 2123 and a fourth internal surface 2124 of the confining groove 212 as shown in FIG. 2B. Moreover, the gap (D3) denotes the distance between the first external side 2322 and second internal surface 2122 while the gap (D5) denotes the distance between the first internal side 2321 and first internal surface 2121. Similarly, the gap (D2) denotes the distance between the second external side 2342 and fourth internal surface 2124 while the gap (D7) denotes the distance between the second internal side 2341 and third internal surface 2123. In geometry, with rotational angle being less than or equivalent to one degree (1°), in this embodiment, it is found following equations: The gap (D2) between the second external side 2342 and fourth internal surface 2124 approximately equals the length (L3) of second stem arm multiplies the rotational angle θ. The gap (D3) between the first external side 2322 and second internal surface 2122 approximately equals the length (L1) of first stem arm multiplies the rotational angle θ. The gap (D5) between the first internal side 2321 and first internal surface 2121 approximately equals the length (L2) of first shank arm multiplies the rotational angle θ. And the gap (D7) between the second internal side 2341 and third internal surface 2123 approximately equals the length (L4) of second shank arm multiplies the rotational angle θ.

It is apparent that the gap (D5) between the first internal side 2321 and first internal surface 2121 is less than the gap (D3) between the first external side 2322 and second internal surface 2122 while the gap (D7) between the second internal side 2341 and third internal surface 2123 is less than the gap (D2) between the second external side 2342 and fourth internal surface 2124. Preferably, each of the gapes (D5) and (D7) is 0.5 mm; each of the gapes (D3) and (D2) is 2 mm.

Besides, the gap (D4) denotes the distance between sides of face to face for the first active button portion 231 and the compass plate 213 while the gap (D1) denotes the distance between sides of face to face for the second passive button portion 235 and the compass plate 213. Preferably, the gap (D4) is 0.6 mm while the gap (D1) is 0.1 mm.

Figure 3A:
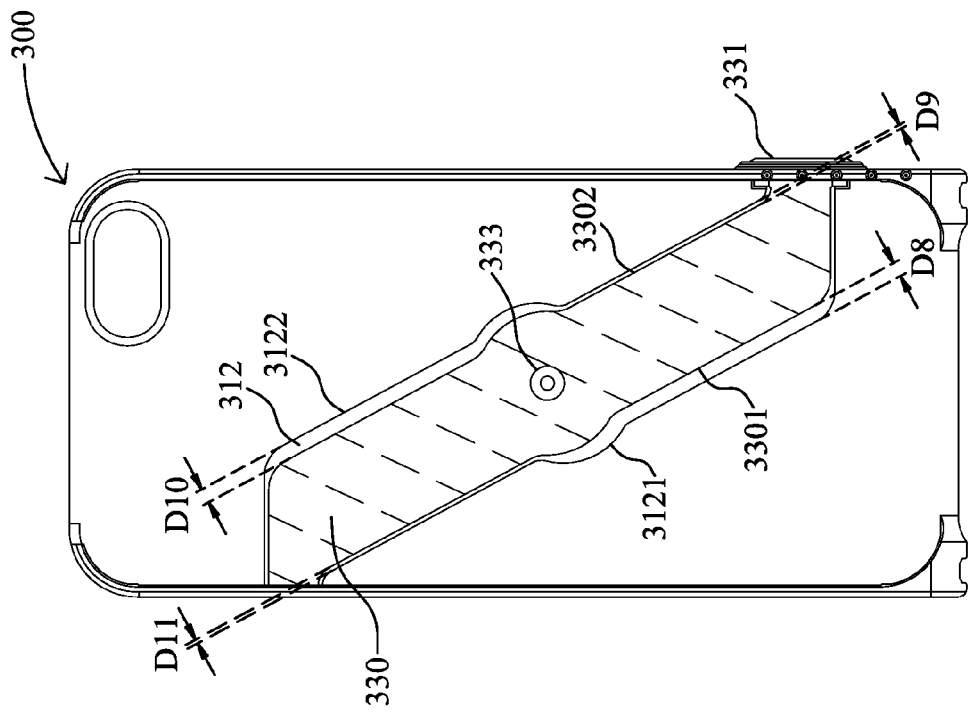
FIGS. 3A and 3B are internal planar and lateral views showing another photographic assist apparatus of mobile communications unit for the second exemplary embodiment of the present invention.
Figure 3B:
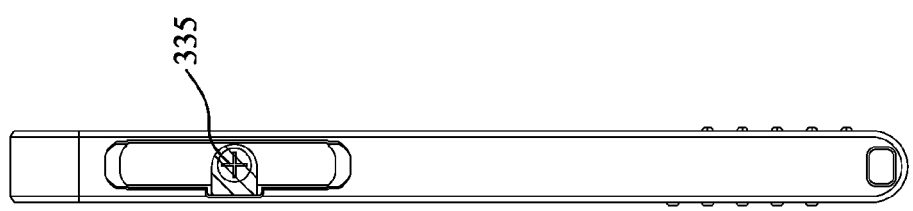

FIGS. 3A and 3B show another photographic assist apparatus 300 of mobile communications unit 100 for the second exemplary embodiment of the present invention. Here, both profiles of the rod 330 and the corresponding confining groove 312 are shaped into parallelogram instead of hand-crank-shape such that the edges of face to face for the rod 330 and the corresponding edges of the confining groove 312 are defined as left flank 3301 and right flank 3302 of the rod 330 in corresponding with left wall 3121 and right wall 3122 of the confining groove 312 as shown in FIG. 3A. Moreover, in lower section, the gap (D8) denotes the distance between the left flank 3301 and left wall 3121 while the gap (D9) denotes the distance between the right flank 3302 and right wall 3122. Similarly, in upper section, the gap (D10) denotes the distance between the right flank 3302 and right wall 3122 while the gap (D11) denotes the distance between the left flank 3301 and left wall 3121. In order to reserving allowance for clockwise rotation of the parallelogram rod 330 on a shaft 220 if user presses a first active button portion 331, the gap (D8) between the left flank 3301 and left wall 3121 is greater than the gap (D9) between the right flank 3302 and right wall 3122 and the gap (D10) between the right flank 3302 and right wall 3122 is greater than the gap (D11) between the left flank 3301 and left wall 3121.

Figure 4:
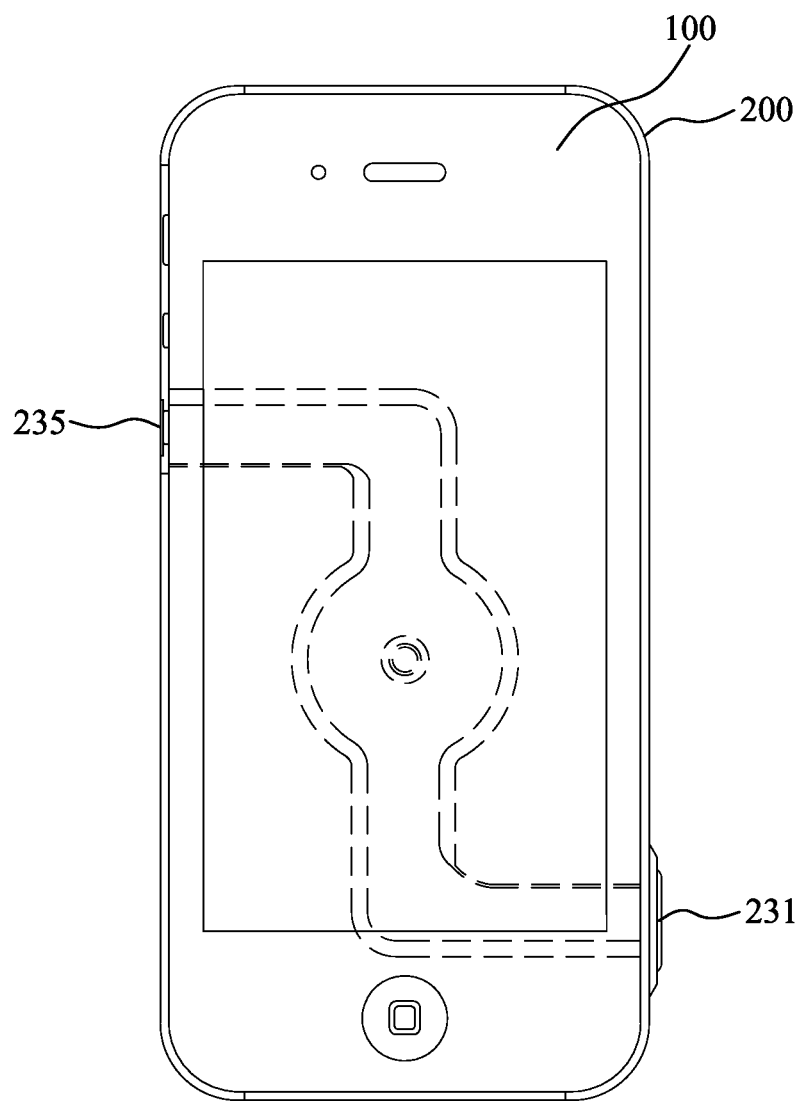
FIG. 4 is a planar schematic view showing an assembly for a photographic assist apparatus and a mobile communications unit for one exemplary embodiment of the present invention.
Figure 4D:
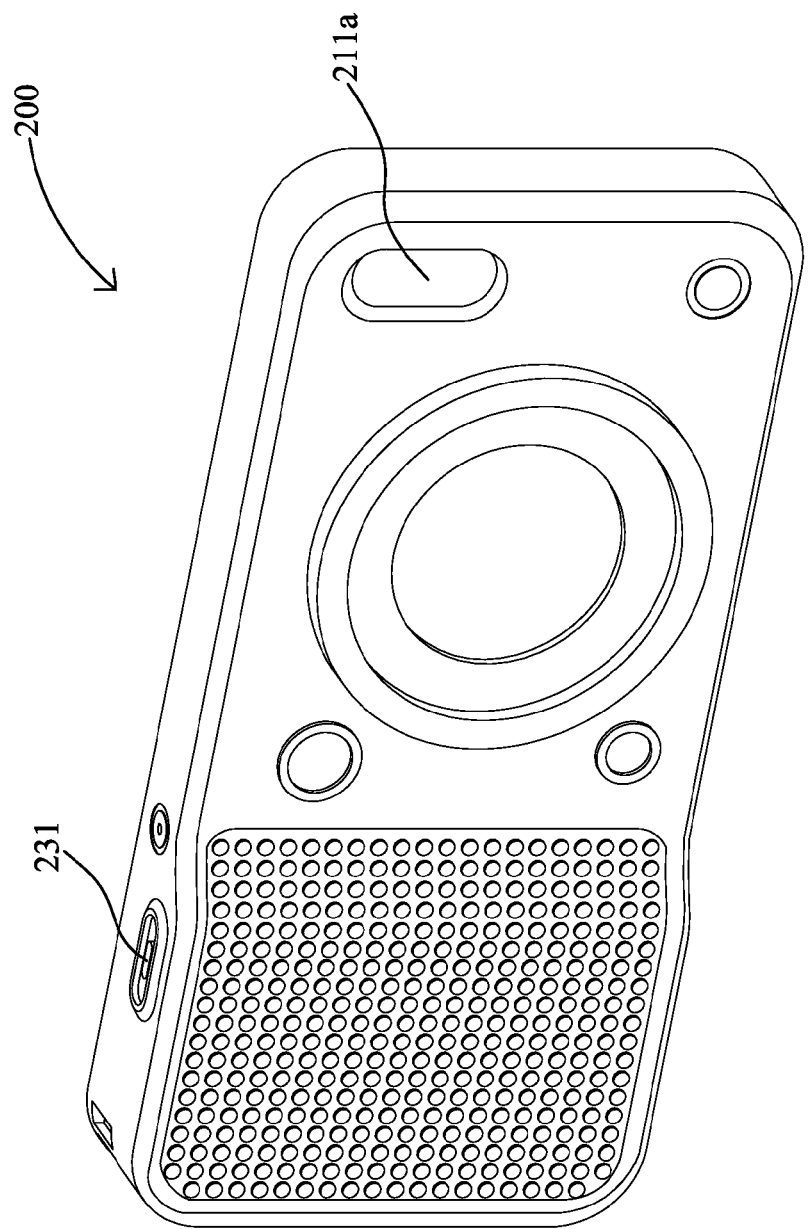

FIG. 4 is a planar schematic view showing an assembly for a photographic assist apparatus 200 and the smart cellular phone 100 for one exemplary embodiment of the present invention. Here, the smart cellular phone 100 is put into the tank of the photographic assist apparatus 200 with the obverse side facing upwardly such that the hand-crank-shaped rod is sandwiched between the rear side of the smart cellular phone 100 and the bottom plate of the photographic assist apparatus 200. With this configuration, the first active opening is located in the lower section of right first compass plate for exposing the active button portion 231 to the user while the second passive opening is located in the upper section of left second compass plate for exposing the passive button portion 235 to corresponding physical shutter button of the mobile communications unit 100.

Figures 5A, 5B, 5C:
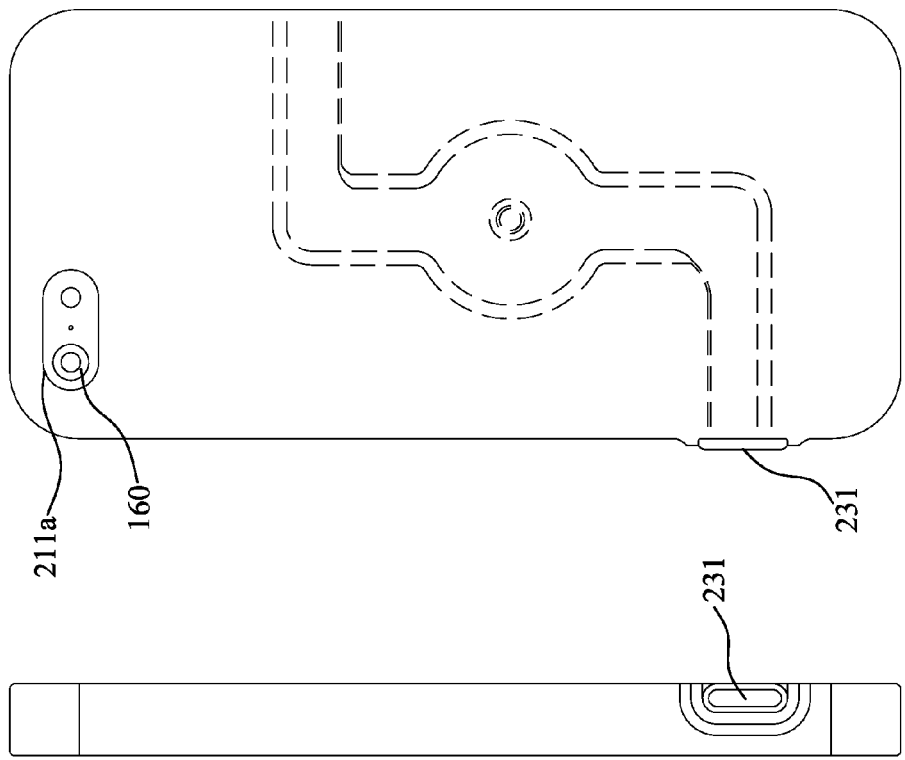
FIGS. 5A to 5C are a series of schematic views respectively showing a planar back view, a left lateral view and a right lateral view for a photographic assist apparatus of mobile communications unit in another exemplary embodiment of the present invention.

FIGS. 4A to 4D are a series of schematic views respectively showing a planar back view, a left lateral view, a right lateral view and a perspective back view for a photographic assist apparatus of mobile communications unit in one exemplary embodiment of the present invention. Here, the bottom plate of the photographic assist apparatus 200 or 300, can be further enveloped by an additional decorative cover shaped as conventional camera (as shown in FIG. 4A). FIGS. 5A to 5C are a series of schematic views respectively showing a planar back view, a left lateral view and a right lateral view for a photographic assist apparatus of mobile communications unit in another exemplary embodiment of the present invention. Here, the bottom plate of the photographic assist apparatus 200 or 300, can be further enveloped by an additional decorative cover shaped as simple plane (as shown in FIG. 5A). Both of the decorative covers can be collocated with the structure of the photographic assist apparatus 200 or 300 as shown in FIGS. 2A to 3A in the present invention to form different products.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A photographic assist apparatus of mobile communications unit comprising:

a tank, comprising a bottom plate and a pair of juxtaposed parallel of first compass plate and second compass plate, the first compass plate having a first active opening and the second compass plate having a second passive opening, such that the first and the second compass plates surrounds and contacts a peripheral of the bottom plate, to define an accommodating space, wherein the first active opening is diagonally opposite to the second passive opening, and the bottom plate comprises a confining groove extending from the first active opening to the second passive opening;

a shaft, fixed in the confining groove of the tank;

a rod, having a profile corresponding to a profile of the confining groove for accommodated in the confining groove with slightly confined allowance, and comprising a central portion, a first active button portion interlocked with a second passive button portion, the central portion having a shaft hole, wherein the first active button portion and the second passive button portion are respectively disposed at both ends of the rod, the first active button portion is assembled in the first active opening, and the second passive button portion is assembled in the second passive opening, and the shaft is placed through the shaft hole, when an user presses the first active button portion, the second passive button portion is interlocked to inwardly press via the rotation of the rod on the shaft with a maximal rotational angle of the rod being limited to one degree by the confined allowance between the confining groove and the rod.

2. The photographic assist apparatus of mobile communications unit as claimed in claim 1, wherein the rod is a hand-crank-shaped slab comprising a first bent portion and a second bent portion such that the first bent portion is disposed between the first active button portion and the central portion while the second bent portion is disposed between the second passive button portion and the central portion.

3. The photographic assist apparatus of mobile communications unit as claimed in claim 2, wherein both of the first bent portion and the second bent portion are configured as right angle such that both of the first bent portion and the second bent portion face outwardly in opposed manner.

4. The photographic assist apparatus of mobile communications unit as claimed in claim 3, wherein the first active opening is created in a lower section of the first compass plate for exposing the first active button portion to the user while the second passive opening is created in an upper section of the second compass plate for exposing the second passive button portion, as well as the first bent portion, the central portion and the second bent portion of the rod are arranged in line to be parallel with the first compass plate and the second compass plate.

5. The photographic assist apparatus of mobile communications unit as claimed in claim 2, wherein a distance between the first bent portion and the shaft hole of the rod is larger than a distance between the second bent portion and the shaft hole of the rod.

6. The photographic assist apparatus of mobile communications unit as claimed in claim 5, wherein the distance between the first bent portion and the shaft hole of the rod is in range of 26.65 mm to 31.05 mm.

7. The photographic assist apparatus of mobile communications unit as claimed in claim 6, wherein the distance between the second bent portion and the shaft hole of the rod is in range of 22.25 mm to 26.65 mm.

8. The photographic assist apparatus of mobile communications unit as claimed in claim 2, wherein a minimal distance between a peripheral of the shaft and an inner surface of the shaft hole is in range of 0.05 mm to 0.10 mm.

9. The photographic assist apparatus of mobile communications unit as claimed in claim 2, wherein both profiles of the central portion and a corresponding portion of the confining groove are shaped into juxtaposed combination of dual arc lobes.

10. The photographic assist apparatus of mobile communications unit as claimed in claim 2, wherein the first bent portion of the rod has a first internal side opposite to a first external side, the confining groove has a first internal surface opposite to a second internal surface, the first internal side and the first external side of the first bent portion correspond with the first internal surface and the second internal surface of the confining groove, such that a distance between the first internal side and the first internal surface is less than a distance between the first external side and the second internal surface.

11. The photographic assist apparatus of mobile communications unit as claimed in claim 2, wherein the second bent portion of the rod has a second internal side opposite to a second external side, the confining groove has a third internal surface opposite to a fourth internal surface, the second internal side and the second external side of the second bent portion correspond with the third internal surface and the fourth internal surface of the confining groove, such that a distance between the second internal side and the third internal surface is less than a distance between the second external side and the fourth internal surface.

12. The photographic assist apparatus of mobile communications unit as claimed in claim 1, wherein both profiles of the rod and the confining groove are shaped into parallelogram that the rod has a left flank opposite to a right flank, and the confining groove has a left wall opposite to a right wall, such that in a region from the first active button portion to the central portion, a distance between the left flank and the left wall is greater than a distance between the right flank and the right wall; while in a region from the second passive button portion to the central portion, a distance between the right flank and the right wall is greater than a distance between the left flank and the left wall.

13. The photographic assist apparatus of mobile communications unit as claimed in claim 1, wherein the rod has a thickness in 1 mm and a width in 15 mm.

14. The photographic assist apparatus of mobile communications unit as claimed in claim 1, wherein a size for the accommodating space of the tank is big enough to accommodate a smart cellular phone.

* * * * *